May 30, 1967     C. F. BALAZS ETAL     3,323,092

STRAIN GAUGE

Filed Oct. 29, 1965

INVENTORS.
Conrad F. Balazs
William W. Burlew
BY
*Robert B. Ingraham*
AGENT

United States Patent Office 3,323,092
Patented May 30, 1967

3,323,092
STRAIN GAUGE
Conrad F. Balazs and William W. Burlew, Midland, Mich., assignors to The Dow Chemical Company, Midland, Mich., a corporation of Delaware
Filed Oct. 29, 1965, Ser. No. 505,673
5 Claims. (Cl. 338—6)

This invention relates to an improved strain gauge particularly suited to measure strain in synthetic resinous materials and in particular is suited for creep valuation of rupturable materials.

Oftentimes creep testing of synthetic resinous materials is accomplished by placing a sample to be evaluated under stress for long periods of time and measuring the elongation with a suitable strain gauge. Oftentimes in many samples being evaluated, such as by strain, which have a relatively low elongation prior to rupture, it is sometimes difficult to salvage the strain gauge in undamaged condition after the sample has broken.

It is the object of this invention to provide an improved strain gauge for the evaluation of synthetic resinous materials.

A further object of this invention is to provide an improved strain gauge which is undamaged by rupture of the sample.

These benefits and other advantages in accordance with the present invention are achieved in a strain gauge which comprises in cooperative combination a first element and a second element, the second element comprising a spring member having an arched configuration, the arched configuration having a first leg and a second leg, the first leg terminating in an edge generally directed toward the second leg, the second leg having affixed thereto means to secure the second element to a member being evaluated, the arched member having a strain measuring element responsive to the deflection of the arched member, the first element being so constructed and arranged so as to mount to the sample being evaluated, the first element defining at least one lip member adapted to engage the terminal edge of the first leg of the arched member in a releasable manner and to release from the first leg when the first and second legs have been separated by a predetermined distance.

Further features and advantages of the present invention will become more apparent when taken in connection with the specification and drawing therein.

Figure 1:
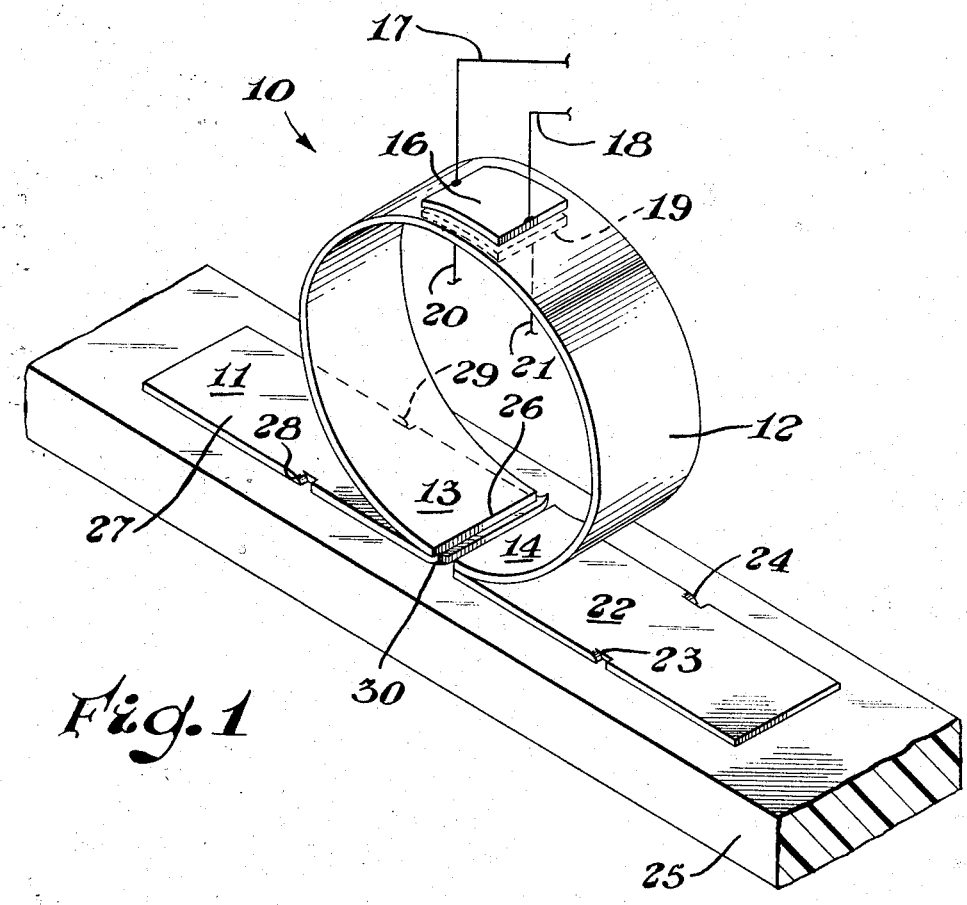

In FIGURE 1 there is schematically illustrated a representation of a strain gauge in accordance with the present invention generally designated by the reference numeral 10. The strain gauge 10 comprises in cooperative combination a first element 11 and a second element 12. The second element 12 has a generally arched ribbon like configuration and a first leg 13 and a second leg 14. The element 12 is affixed to a first resistance type strain measuring element 16 having a first lead 17 and a second lead 18. A second strain measuring element 19 is affixed to the arched member 12 and is oppositely disposed to the first strain measuring element 16. The second element 19 has a first leg 20 and a second leg 21. A sample engaging member 22 is rigidly secured to the terminal portion of the second leg 14 of the arched member 12. The sample engaging member 22 defines a first projection 23, a second projection 24, each adapted to engage a deformable sample such as a thermoplastic resinous bar or sheet 25 and resist movement of the member 22 in the direction of the first leg 13. The first leg 13 of the element 12 terminates in a terminal edge 26 directed toward a second leg 14. The first member 11 of the strain gauge 10 comprises a sample engaging portion 27 having defined therein projections 28 and 29 suited to engage a deformable sample such as the thermoplastic resinous sheet or bar 25 and prevent movement of the member 11 toward the member 12. The member 11 defines a terminal edge engaging means or lip 30 adapted to releasably engage the terminal edge 26 of the first leg 13 of the arched member 12.

Figure 2:
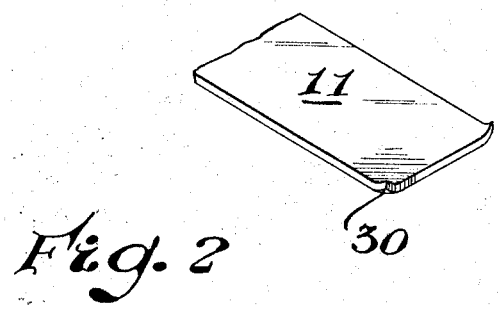

In FIGURE 2 there is illustrated a fractional view of the member 11 and the upwardly turned lip portion 30.

In operation of the strain gauge in accordance with the invention, the first and second members are secured to the sample being evaluated by the points or projections such as the projections 23, 24, 28 and 29 which are forced into the plastic body 25 or optionally secured there by means of a suitable adhesive means such as an adhesive means having a pressure sensitive adhesive therein. The edge 26 of the first leg 13 is placed in engagement with the lip portion 30 and the leads 17 and 18 and optionally the leads 20 and 21 connected to a suitable electrical strain indicating means. On rupture of the sample the arched member 12 is distorted within its elastic limit, that is the edge 26 moves away from the leg 14 and the edge 26 is released from the lip 30 of the first element 11 before the member 12 is distorted beyond its elastic limit. Thus on rupture of the sample the strain gauge 10 separates into two components neither of which are deformed or damaged and the strain gauge 10 is readily reuseable.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. A strain gauge comprising in cooperative combination a first element and a second element, the second element comprising a spring member having an arched configuration, the arched configuration having a first leg and a second leg, the first leg terminating in an edge generally directed toward the second leg, the second leg having affixed thereto means to secure the second element to a member being evaluated, the arched member having a strain measuring element responsive to the deflection of the arched member, the first element being so constructed and arranged so as to mount to the sample being evaluated, the first element defining at least one lip member adapted to engage the terminal edge of the first leg of the arched member in a releasable manner and to release from the first leg when the first and second legs have been separated by a distance which does not exceed the elastic limit of the arched configuration.

2. The strain gauge of claim 1 wherein the first and second members define sample engaging points.

3. The strain gauge of claim 1 wherein two strain measuring elements are disposed on the arched member.

4. The strain gauge of claim 1 wherein the spring member has a generally ribbon like configuration.

5. The strain gauge of claim 1 wherein the lip member comprises deformed edge portions of the first member.

References Cited

UNITED STATES PATENTS

| | | | |
|---|---|---|---|
| 2,423,867 | 7/1947 | Zener et al. | |
| 2,486,625 | 11/1949 | Allen | 338—6 |
| 2,607,998 | 8/1952 | Weaver et al. | |
| 2,666,262 | 1/1954 | Ruge. | |
| 2,744,181 | 5/1956 | Rea | 338—6 |
| 2,815,424 | 12/1957 | Painter | 338—6 |
| 3,102,420 | 9/1963 | Mason | 338—2 |

RICHARD M. WOOD, *Primary Examiner.*

W. D. BROOKS, *Assistant Examiner.*